United States Patent [19]

Prevost et al.

[11] Patent Number: 5,266,655
[45] Date of Patent: Nov. 30, 1993

[54] SINGLE PHASE/AMORPHOUS BLENDS OF AMORPHOUS SEMIAROMATIC POLYAMIDES AND SEMICRYSTALLINE NYLON POLYAMIDES

[75] Inventors: Jean-Pierre Prevost, Villeurbanne; Daniel Roberjot, Feyzin, both of France

[73] Assignee: Rhone-Poulenc Chimie, Courbevoie, France

[21] Appl. No.: 939,048

[22] Filed: Sep. 3, 1992

Related U.S. Application Data

[63] Continuation of Ser. No. 549,745, Jul. 9, 1990, abandoned.

[30] Foreign Application Priority Data

Jul. 11, 1989 [FR] France ............................ 89 09670

[51] Int. Cl.$^5$ ................... C08L 77/02; C08L 77/06; C08L 77/10
[52] U.S. Cl. ........................... 525/432; 525/420; 525/419; 525/418
[58] Field of Search ............ 525/432, 58, 418, 419, 525/420

[56] References Cited

U.S. PATENT DOCUMENTS

| | | | |
|---|---|---|---|
| 3,642,941 | 2/1972 | Schneider et al. | 260/857 |
| 3,646,156 | 2/1972 | Schneider et al. | 260/857 |
| 4,111,921 | 9/1978 | Bier et al. | 528/339 |
| 4,404,317 | 9/1983 | Epstein et al. | 525/432 |
| 4,486,507 | 12/1984 | Schumacher | 525/432 |
| 4,559,372 | 12/1985 | Giroud-Abel | 524/79 |
| 4,731,421 | 3/1988 | Hoppe et al. | 525/432 |
| 4,847,356 | 7/1989 | Hoppe et al. | 525/432 |
| 4,937,315 | 6/1990 | Barthelemy | 525/432 |
| 4,952,628 | 8/1990 | Blatz | 525/58 |
| 4,963,646 | 10/1990 | Galland et al. | 525/432 |
| 4,990,562 | 2/1991 | Chou et al. | 525/58 |

FOREIGN PATENT DOCUMENTS

| | | |
|---|---|---|
| 0070001 | 1/1983 | European Pat. Off. . |
| 3200428 | 7/1983 | Fed. Rep. of Germany ...... 525/432 |
| 2325673 | 4/1977 | France . |
| 58-53949 | 3/1983 | Japan ................. 525/432 |

*Primary Examiner*—James J. Seidleck
*Assistant Examiner*—Clark: W. R. H.
*Attorney, Agent, or Firm*—Burns, Doane, Swecker & Mathis

[57] ABSTRACT

Single-phase and amorphous polymer blends, well adapted for the production of resilient shaped articles, e.g., by molding, include (i) and amorphous semiaromatic polyamide homo- or copolymer, e.g., prepared from 2-methyl-1,5-pentamethylenediamine or mixture thereof with 2-ethyl-1,4-tetramethylenediamine and isophthalic acid or mixture thereof with terephthalic acid, and (ii) a minor amount, up to 40% by weight, of a semicrystalline nylon 66 or nylon 6 polyamide.

9 Claims, No Drawings

SINGLE PHASE/AMORPHOUS BLENDS OF AMORPHOUS SEMIAROMATIC POLYAMIDES AND SEMICRYSTALLINE NYLON POLYAMIDES

This application is a continuation of application Ser. No. 07/549,745, filed Jul. 9, 1990, now abandoned.

BACKGROUND OF THE INVENTION

1. Field of the Invention

The present invention relates to novel single-phase and amorphous polymeric blends, well adapted for the production of molded shaped articles therefrom, comprising a major amount of an amorphous semiaromatic polyamide prepared from at least one alkylpentamethylenediamine and aromatic dicarboxylic acid(s) and a minor amount of a semicrystalline polyamide of nylon type prepared from hexamethylenediamine, adipic acid and/or ε-caprolactam. The present invention also relates to a process for the preparation of such novel polymer blends.

2. Description of the Prior Art

Wholly aliphatic linear polyamides of nylon type, of high molecular weight, have many physical and chemical properties which make them suitable for production of a wide variety of shaped articles such as fibers, films and other molded objects.

Polyhexamethylene adipamide, or nylon 66, is one example of a polyamide which has been developed very extensively. However, these polymers exhibit a number of defects, the significance of which is a function of the intended use thereof. In the majority of cases, these polyamides are semicrystalline polymers and are therefore not transparent, and they cannot be employed in fields of application which require transparency. Furthermore, these polyamides generally exhibit a shrinkage on molding, which may be significant, a water uptake which can be considerable and, as a corollary, a dimensional stability to moisture which may be insufficient and mechanical properties which are adversely affected by the surrounding moisture and which also deteriorate at temperatures above 100° C., because of the low value of their glass transition temperature Tg (which is generally below 80° C.).

A great many patents describe polyamides which have different recurring units such as, particularly, polyamides comprising mixed aliphatic and aromatic recurring units, which make it possible to wholly or partially avoid those shortcomings described above. The introduction of aromatic rings provides an increase in the melting or softening point and in the Tg, resulting particularly in a better retention of mechanical properties at high temperatures. Moreover, when their composition is altered, these polyamides may be amorphous polymers.

Typical amorphous semiaromatic polyamides include, for example, the copolymers prepared from hexamethylenediamine and isophthalic (60 to 90 mol % in the mixture of the diacids) and terephthalic acids (cf. U.S. Pat. No. 3,382,216), which exhibit a Tg on the order of 100° C. to 120° C., and the copolymers prepared from 2-methylpentamethylenediamine and isophthalic (15 to 30 mol % in the mixture of the diacids) and terephthalic acids (cf. FR-A-2,325,673), which exhibit a Tg on the order of 137° C. to 142° C. However, because of high melt viscosities, the conversion of these amorphous semiaromatic polyamides by a melt route, for example by injection molding, requires a high processing temperature which is liable to retard their development. This temperature is, for example, on the order of 280° C. to 300° C. in the case of the above-mentioned copolymers prepared from hexamethylenediamine and aromatic acids, and from 290° C. to 310° C. in the case of the above-mentioned copolymers prepared from 2-methylpentamethylenediamine and aromatic acids.

Furthermore, semiaromatic polyamides exhibit a very low shrinkage which frequently leads to difficulties in the operations of demolding the shaped articles produced therefrom.

Thus, serious need continues to exist in the semiaromatic polyamide art for improved polyamide compositions exhibiting at least the following combination of the properties:

(i) adapted for use in fields of application which require an excellent transparency;

(ii) having a Tg higher than 100° C. such as to permit the production, for example by injection molding, of shaped articles exhibiting better polymer stability and better retention of mechanical properties at elevated temperatures, relative to compositions prepared from a polyamide of nylon type;

(iii) being easily converted by a melt route at a processing temperature which is not too high, of the type utilizing temperatures ranging from 270° C. to 290° C., because of a melt viscosity which is less than that of a semiaromatic polyamide; and (iv) offering, where appropriate, a slight molding shrinkage, the degree of which is greater than that obtained in the case of the semiaromatic polyamide, but less than that obtained in the case of a polyamide of nylon type, such as to facilitate demolding of the shaped articles produced therefrom.

SUMMARY OF THE INVENTION

Accordingly, a major object of the present invention is the provision of improved single-phase and amorphous blends comprising a particular amorphous semiaromatic polyamide and an appropriate semicrystalline polyamide of nylon type, in which the amount of the polyamide of nylon type (in the blend of the two types of polyamides) is minor, in order to preserve the amorphous nature of the blends.

Indeed, it has now been found that particular amorphous semiaromatic polyamides can be blended with appropriate semicrystalline polyamides of nylon type (employed in a minor amount in the combination of the two types of polyamides) to produce blends which permit:

(a) in addition to satisfying the aforesaid objective, especially as regards the requirements concerning transparency, Tg values and conversion conditions discussed above;

(b) the realization of resilience properties which, on the one hand, are superior to those provided by the semiaromatic polyamide used alone in the case of analysis temperatures ranging from room temperature 23° C.) to temperatures as low as those ranging, for example, from 0° C. to −25° C. and, on the other hand, remain substantially constant throughout this temperature interval ranging from room temperature to, for example, −25° C.

The production of blends comprising an amorphous semiaromatic polyamide and a semicrystalline polyamide of nylon type is known to this art. In particular, EP-A-70,001 describes blends comprising 2% to 95% by weight of an amorphous semiaromatic polyamide prepared from hexamethylenediamine, a cyclic diamine such as bis(p-aminocyclohexyl)methane and isophthalic and terephthalic acids and 98% to 5% by weight of a semicrystalline polyamide of nylon type. This '001 patent relates that the use of minor amounts of polyamide of nylon type (5% to 40% by weight in the blend of the two types of polyamides) improves the solvent resistance of amorphous semiaromatic polyamides, but does not address the problem in respect of resilience which characterizes the polymer blends of the present invention, in which the amorphous semiaromatic polyamide presents a different chemical structure.

Briefly, the present invention features novel single-phase and amorphous polymer blends including an amorphous semiaromatic polyamide and a semicrystalline polyamide of nylon type, in which the amount of semicrystalline polyamide of nylon type in the blend of the two types of polyamide is minor, such blends comprising:

(i) an amorphous semiaromatic polyamide, which may be a homo- or a copolymer, which comprises the recurring structural units of the formulae (I), (II), (III) and (IV):

(I) representing the structural unit:

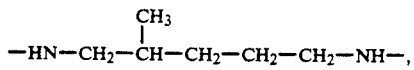

(II) representing the structural unit:

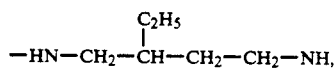

(III) representing the structural unit:

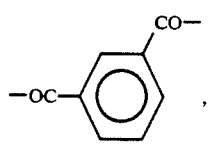

(IV) representing the structural unit:

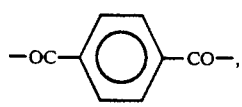

and wherein the structural units of formulae (II) and (IV) are optional; the molar ratio of the units (I)+optionally (II) relative to the sum of the units (III)+optionally (IV) is equal to 1; the amount of the units (II) in the mixture of (I)+(II) ranges from 0% to 15 mol %, and that of the units (I), relative to the same mixture, ranges from 100% to 85 mol %; and the amount of the units (IV) in the mixture of (III)+(IV) ranges from 0% to 90 mol %, and that of the units (III), relative to the same mixture, ranges from 100 to 10 mol %; and (ii) a semicrystalline polyamide of nylon type, which may be a homo- or copolymer, which comprises nylon 66 (polymer of hexamethylenediamine and of adipic acid), nylon 6 (polymer of ε-caprolactam), mixtures of such polymers and copolymers obtained from the monomers used for the preparation of nylons 66 and 6; with the proviso that (iii) the amount of the semicrystalline polyamide (ii) constitutes not more than 40% of the weight of the combination of semiaromatic polyamide (i)+semicrystalline polyamide (ii).

DETAILED DESCRIPTION OF THE PREFERRED EMBODIMENTS OF THE INVENTION

More particularly according to the present invention, regarding the structure of the amorphous semiaromatic polyamide (i), the units of formula (I) are provided by 2-methyl-1,5-pentamethylenediamine. With respect to the optional units of formula (II), these are provided by 2-ethyl-1,4-tetramethylenediamine. The synthesis of the 2-methylpentamethylenediamine can be by hydrogenation of the dinitrile of 2-methylglutaric acid using known technique. Similarly, the synthesis of 2-ethyltetramethylenediamine can be carried out by hydrogenation of the dinitrile of 2-ethylsuccinic acid. With regard to the units of formula (III) and optionally (IV), these are respectively provided by isophthalic acid and optionally terephthalic acid, or from a derivative of these acids, such as, for example, a dihalide or a diester.

In a preferred embodiment of the invention, an amorphous semiaromatic polyamide (i) is used which has, on the one hand, a structure corresponding to that indicated above, in which the amount of the units (II) in the mixture of (I)+(II) ranges from 0% to 5 mol %, and that of the units (I), also relative to this mixture, ranges from 100% to 95 mol %, and the amount of the units (IV) in the mixture of (III)+(IV) ranges from 0% to 85 mol %, and that of the units (III), also relative to this mixture, ranges from 100% to 15 mol %; and, on the other hand, viscosity characteristics, expressed as the viscosity index (VI), measured according to ISO standard R 307 (2nd edition of 1984) in meta-cresol at 25° C. on a solution containing 0.5 g of polymer (dried for 2 hours at 60° C. under argon purging) in 100 cm³ of meta-cresol, which are at least equal to 90 ml/g.

In an even more preferred embodiment of this invention, an amorphous semiaromatic polyamide (i) is used which has a structure corresponding to the preferred structure indicated above, in which the amount of the units (IV) in the mixture of (III)+(IV) ranges from 60% to 85 mol %, and that of the units (III), also relative to this mixture, ranges from 40 to 15 mol %, and further wherein the VI values range from 100 ml/g to 150 ml/g.

The amorphous semiaromatic polyamides (i) are known polymers (cf. in particular FR-A-2,325,673), which can be prepared by polycondensation processes which are well known to this art: bulk polycondensation in the melt, employing diamine(s) and diacid(s) or diester(s) of diacid(s), or polycondensation in solution or interfacial polycondensation employing diamine(s) and dihalide(s) of diacid(s).

To carry out such polycondensation, it is preferred to conduct the process in bulk, in the melt, using the original process described in French Application No. 89/02,467, filed Feb. 21, 1989 and assigned to the assignee hereof. In accordance with this process, a starting composition comprising either an amine reactant (2-methylpentamethylenediamine alone or mixed with not more than 15 mol % of 2-ethyltetramethylenediamine) and an acidic reactant (isophthalic acid alone or mixed with not more than 90 mol % of terephthalic acid), or their salt(s), is polycondensed, the operation being carried out in a closed system of the autoclave type and entailing a sequence of the following stages:

Stage 1: in which, the autoclave being closed, the temperature of the starting composition is progressively increased to a certain value T1, above 110° C.; then, at a constant pressure P equal to the autogenous pressure of water vapor established, which is above atmospheric pressure, the water present in the reaction mass is removed by steady distillation, while, simultaneously, the temperature of the reaction mass is increased progressively to a value T2, which is higher than the temperature T1 attained before distillation;

Stage 2: in which the pressure is progressively lowered from the value of the autogenous pressure to atmospheric pressure and, optionally, the temperature of the reaction mass is simultaneously increased to a value T3 which is some ten to several tens of degrees Celsius higher than the temperature T2 attained before decompression, while ensuring steady distillation of water during this decompression period;

Stage 3: in which the polycondensation is completed by stirring the reaction mass for a certain period of time, the operation being carried out at atmospheric pressure and optionally (or) at a lower pressure with a mass temperature equal to or above the temperature T2 or T3 obtained at the end of stage 2, for a sufficient period of time as to produce a polyamide which has the desired structural and viscosity characteristics.

The process described immediately above is characterized by the following parameters:

(1) the starting compositions, on the one hand, additionally necessarily contain water in sufficient amount to permit the distillation of Stage 1 to be conducted under the particular conditions of temperatures (T1 and T2) and of pressure (P) which are indicated in the subparagraph which follows, and, on the other hand, additionally, but optionally contain a catalyst;

(2) in Stage 1, after the autoclave has been closed, the temperature of the starting composition is progressively increased to a value T1 ranging from 160° C. to 190° C.: then, at a constant pressure P equal to the autogenous pressure of water vapor established, which ranges from 0.5 to 1.2 MPa, the water present in the reaction mass is removed by steady distillation, while simultaneously the temperature of the reaction mass is progressively raised to a value T2 ranging from 210° C. to 235° C.

The above process is applicable to compositions comprising either stoichiometric amounts of an acidic reactant and of an amine reactant contributing equivalent numbers of COOH and NH$_2$ groups, or their stoichiometric salt(s).

By the expression "water present in the reaction mass" in the description of Stage 1, concerning the distillation, is intended the water present in the starting compositions plus the water which may be formed by a polycondensation reaction between the acidic reactant and the amine reactant. The amount of water present in the starting compositions is not critical, as long as it permits conducting the distillation of Stage 1 under the particular conditions of temperatures (T1 and T2) and of autogenous pressure (P) indicated above; this amount of water can be easily determined by one skilled in this art using simple tests.

To carry out Stage 1 of the polycondensation process described above, it is possible to use starting compositions which are in the form of mixtures: either based on the acidic reactant, the amine reactant, water and optionally a catalyst, the acidic reactant being employed in the solid state and the amine reactant being employed, for example, in the state in which it naturally occurs, or in the form of an aqueous solution; or based on the salt(s) of diacid(s) and of diamine(s), water and optionally a catalyst, the salt(s) being employed, for example, in the solid state, in aqueous dispersion, or in the form of an aqueous solution.

With regard to the catalyst which can be employed, this generally is either a compound ($\alpha$), or a compound ($\beta$), with ($\alpha$) representing an inorganic oxygen-containing mono- or polyacid or an organic oxygen-containing mono- or polyacid other than a carboxylic acid, in which at least one of the acidic functional groups thereof has an ionization constant pk$_a$ equal to or lower than 4 in water at 25° C., and ($\beta$) representing an alkali metal or alkaline earth metal salt of such acid ($\alpha$).

Concerning the carrying out of Stage 1 of the subject polycondensation process, it should be appreciated that the progressive heating of the starting composition to the temperature T1 can be conducted over a period of time of, for example, from 10 minutes to 2 hours. As regards the distillation under constant autogenous pressure P, this is carried out over a period of time ranging, for example, from 30 minutes to 3 hours 30 minutes.

In Stage 1 it will be preferred to conduct the distillation under a constant autogenous pressure P ranging from 0.6 to 1 MPa by selecting a starting distillation temperature T1 ranging from 170° C. to 185° C. and a temperature T2, immediately prior to decompression, ranging from 215° C. to 230° C.

In Stage 2, the decompression, which may be in successive steps, is carried out over a period of time ranging, for example, from 20 minutes to 2 hours 30 minutes and the temperature of the reaction mass is simultaneously increased to a value T3 ranging, for example, from 250° C. to 320° C.

In Stage 3, the polycondensation is finished by permitting the reaction mass to react at the temperature T3, or at a temperature which may be higher than T3 by a few degrees to about ten degrees, the operation preferably being carried out under a reduced pressure ranging from $1 \times 10^2$ to $1000 \times 10^2$ Pa for a period of time (including the period of application of reduced pressure) ranging, for example, from 10 minutes to 3 hours.

It is also within the scope of the present invention to use an amorphous semiaromatic polyamide (i) which additionally comprises, other than the recurring units of formulae (I), (II), (III) and (IV), recurring units generating amide functional groups, which have a structure other than those of units (I), (II), (III) and (IV), and selected such as to increase the Tg of the semiaromatic polyamide.

With respect to the semicrystalline polyamide of nylon type, preferably used are polymers, mixtures of polymers or copolymers exhibiting viscosity characteristics, expressed as the viscosity index (VI) measured according to ISO standard R 307 (2nd edition of 1984) on the fraction which is soluble in formic acid of 90% purity by weight, which are at least equal to 120 ml/g.

In an even more preferred embodiment of the invention, a semicrystalline polyamide of nylon type is used comprising a nylon 66 (polymer of hexamethylenediamine and adipic acid) exhibiting VI values ranging from 130 ml/g to 180 ml/g.

As regards the amount (iii) of the semicrystalline polyamide (ii) in the blend of the polyamides (i) and (ii), this does not exceed 40% by weight. Above the maximum limit of 40%, the mixtures lose their characteristics of single-phase and amorphous blend and have a melting point. The minimum amount of semicrystalline polyamide (ii) corresponds to the lower limit, below which the blends are difficult to convert by a melt route at a processing temperature which is not too high, on the order of 270° C. to 290° C. This minimum quantity usually represents approximately 10% of the weight of the combination of semiaromatic polyamide (i) plus semicrystalline polyamide (ii). The amount (iii) of the semicrystalline polyamide (ii) may thus range from 10% to 40%. This amount preferably ranges from 20% to 35%, because in this latter range of amounts the blends according to the invention exhibit the twin advantage of, on the one hand, being easily converted by a melt route at a processing temperature which is not too high, ranging from 270° C. to 290° C., and, on the other, providing a single-phase amorphous material offering resilience properties which are superior to those obtained with the semiaromatic polyamide employed by itself in the case of analysis temperatures ranging, for example, from room temperature to −25° C. and, at the same time, also remain substantially constant throughout this temperature range.

Particularly as regards the resilience properties of the blends of the present invention, it has been found that such behavior appears to be specific to the use of the semiaromatic polyamide contained therein, since this behavior is not present when such polyamide is replaced by an amorphous semiaromatic polyamide of another type, for example the copolymer prepared from hexamethylenediamine and isophthalic (70 mol % in the mixture of the diacids) and terephthalic acids (all remaining conditions being otherwise the same).

It too will be appreciated that the blends of the present invention, comprising an amorphous semiaromatic polyamide which is capable of crystallization, such as, for example, the semiaromatic polyamides prepared from a mixture of isophthalic and terephthalic acids wherein the amount of the units (III) derived from isophthalic acid in the mixture of (III)+(IV) is small and ranges from 15% to 40 mol %, and a semicrystalline polyamide of nylon type, always yield a transparent amorphous material which, for example, does not crystallize on reheating during the conversion operations, in the case of amounts of semicrystalline polyamide as high as those ranging from 10% to 40%.

The blends according to the present invention can be formulated using any one of a number of known techniques. In a preferred embodiment, the blends are prepared in two stages: a first stage in which the constituents are stirred together at room temperature (23° C.) in a conventional rapid mixer for powder or granules, and a second stage in which this premix is homogenized by blending in the melt phase, at a temperature ranging from 270° C. to 290° C., the operation being carried out in a device permitting blending of plastic materials in the molten state, preferably a single- or multiscrew extruder. At the end of this treatment, the blends of the invention generally are in the form of rods which are then chopped into granules. These granules will be subsequently employed for converting the blends of the invention using conventional apparatus, for example injection molding or extrusion, to produce shaped objects such as, particularly, solid articles or hollow bodies. With regard to the conversion conditions, the blends according to the invention can, for example, be easily injection molded at melt temperatures which are not too high, advantageously ranging from 270° C. to 290° C.

The usual additives may be added to the blends of the invention, at any time during their preparation. These must, on the one hand, be advantageously soluble in the blend, since transparency plays an important part and, furthermore, they must not be crystallization nuclei. These additives are, for example, antioxidants, light stabilizers, heat stabilizers, plasticizers, optical whiteners, colorants, and the like.

In order to further illustrate the present invention and the advantages thereof, the following specific example is given, it being understood that same is intended only as illustrative and in nowise limitative.

EXAMPLE

In this example, a blend in accordance with the present invention is illustrated, containing: (i) 75% by weight of an amorphous semiaromatic polyamide prepared as indicated below from 2-methyl-1,5-pentamethylenediamine, isophthalic acid (20 mol % in the mixture of the diacids) and terephthalic acid (80 mol % in the mixture of the diacids), exhibiting a viscosity index of 127 ml/g (determined as indicated above using a solution of the polymer in meta-cresol) and (ii) 25% by weight of nylon 66, marketed by Rhône-Poulenc Chimie under the trademark Technyl 50 AP, exhibiting a viscosity index of 140 ml/g (determined as indicated above using the fraction which is soluble in formic acid).

(1) PREPARATION OF THE AMORPHOUS SEMIAROMATIC POLYAMIDE (1.1) Preparation of the Methylpentamethylenediamine Salt of (Isophthalic+Terephthalic) Acids in Aqueous Solution The operation was carried out in a 100-liter reactor equipped:
(a) with a heating system;
(b) with a stirrer of the marine propeller type;
(c) with a system permitting purging with nitrogen and maintaining an oxygen-free atmosphere; and
(d) with a system enabling the volatile products to be condensed.

The following materials were introduced cold into the reactor which was maintained under a gentle nitrogen purge:
(i) 5128.5 g of isophthalic acid (30.8944 moles);
(ii) 20513.9 g of terephthalic acid (123.5776 moles);
(iii) 18635.5 g of 2-methyl-1,5-pentamethylenediamine (160.6509 moles);
(iv) 29518.6 g of distilled water.

The temperature of the mass was increased to 60° C. and the mixture was stirred for 2 hours while purging with nitrogen was maintained. An aqueous solution containing 60% by weight of the stoichiometric salt was thus obtained. The pH then reached the value of 9.2; a molar excess of 4% of amine reactant was used in this preparation.

(1.2) Polycondensation in an Autoclave

The apparatus employed was a 100-liter stainless steel autoclave which was stirred and equipped for operation up to 300° C. and 2.2 MPa pressure. It was fitted:
(a) with a jacketed heating system employing a heat transfer fluid;
(b) with a frame-type stirrer;

(c) with a system permitting pressurizing with nitrogen;

(d) with a circuit permitting volatile products to be condensed and collected; and (e) with a system for applying a subatmospheric pressure.

The aqueous salt solution prepared above was introduced into the autoclave. After 3 nitrogen purges by pressurizing to $4 \times 10^5$ Pa followed by decompression, the aqueous salt solution was concentrated from 60% by weight to 70% by weight over 30 minutes by evaporating off part of the water present in the mixture at atmospheric pressure; the temperature then reached 110.5° C.

The following stages were then carried out in succession:

Stage 1:

The temperature of aqueous solution containing 70% by weight of salt was increased to $T1 = 179°$ C. over 50 minutes while autogenous pressure was maintained. A pressure of 0.7 MPa (P) was then attained. The water present in the reaction mass was then distilled off at a constant pressure of $0.7 \pm 0.02$ MPa for 1 hour, 55 minutes, such as to provide a mass temperature equal to $T2 = 216°$ C.;

Stage 2:

Decompression to atmospheric pressure was carried out over 1 hour, 45 minutes, and the temperature of the mass was increased at the same time to the value $T3 = 261°$ C. while a steady distillation of water continued to be ensured.

Stage 3:

The temperature of the mass was then increased to 280° C. and the polycondensation was finished while continuing to stir the mass at 280° C. at atmospheric pressure for 30 minutes.

Stirring was terminated and a nitrogen pressure was then established in the autoclave and the polymer was drawn off. The latter, extruded from the autoclave in the form of a rod, was cooled by passing it through a cold water bath and it was then granulated and dried.

The polymer obtained was transparent and homogeneous. It had a viscosity index of 127 ml/g.

(2) PREPARATION OF THE BLEND IN ACCORDANCE WITH THE INVENTION

The following constituents were directly contacted for 10 minutes at 23° C. in an Engelsmann model "Roule Fût" mixer rotating at 20-30 revolutions/minute:

(i) 75 parts by weight of granules of the amorphous semiaromatic polyamide prepared in section (1); and (ii) 25 parts by weight of nylon 66 granules.

The premix obtained was then kneaded and homogenized in the molten state in a Leistritz extruder with two screws rotating jointly, comprising screws of diameter D equal to 34 mm and with a length equal to 35 D and comprising a feed zone, a heated mixing zone and a 4-mm diameter die. The operating parameters of the extruder were the following:

| | |
|---|---|
| (a) mixing zone temperature: | 280° C., |
| (b) die temperature: | 280° C., |
| (c) speed of rotation of the screws: | 200 revolutions/minute, |
| (d) material throughput: | 10 kg/hour, |
| (e) residence time: | approximately 2 minutes. |

At the exit of the extruder a rod was obtained, which was cooled and cut into granules approximately 5 mm in length and 4 mm in diameter.

The blend of polyamides according to the invention which was thus obtained in the form of granules was amorphous: it exhibited a Tg of 106° C. but no melting point, and it was transparent; the morphology of the blend and its Tg were established by differential calorimetric analysis (DSC) using a Mettler apparatus of the DSC 30 type (measurement on reheating with a temperature increase of 20° C./minute). The melt viscosity of the blend, determined using a capillary viscometer trademarked Instron 3211, equipped with a die which had a length/diameter ratio equal to 60, was 324 pa.s at 300° C. and at a shear rate of 240 $s^{-1}$.

Charpy impact tests were carried out in order to test the resilience properties of the shaped articles obtained from granules of the blend according to the invention: the resiliences were measured (in $kJ/m^2$) at various temperatures on notched bar-type test specimens according to the specifications of NF standard T 51035, the operation being carried out with test specimens conditioned at RHO (0% relative humidity). The test specimens employed were prepared by injection molding using a Battenfeld screw-plunger machine BSKM 100/70 DS 2000 under the following conversion conditions:

| | |
|---|---|
| (a) material temperature (temperature of the coldest zone - and of the hottest zone): | 280– 310° C., |
| (b) mold temperature: | 80° C., |
| (c) injection material pressure: | 6 MPa, |
| (d) holding pressure: | 3 MPa. |

Injection-molded test specimens exhibited a perfect transparency state and the results of the Charpy impact tests are reported in the Table which follows. It should be noted that molded test specimens which had the same transparency and gave the same impact strength values were obtained when the material temperature was decreased to the range of from 270° to 290° C. when the blend according to the invention was converted using the Battenfeld screw-plunger machine.

By way of comparison (Test A), the same operations as those described above (passing through a twin-screw extruder followed by molding test specimens) were reproduced, but this time using the amorphous semiaromatic polyamide by itself.

At the exit of the extruder, the polymer obtained had a Tg of 142° C. and its melt viscosity was 391 Pa.s. The results of the Charpy impact tests are reported in the Table which follows.

By way of further comparison (Test B), the same operations as those described in Example 1 were reproduced, but this time starting with the following constituents: (i) 50 parts by weight of semiaromatic polyamide and (ii) 50 parts by weight of nylon 66.

At the exit of the extruder, the mixture obtained was no longer amorphous: it had a Tg of 82° C. and a melting point of 248° C. The results of the impact tests are reported in the Table which follows.

By way of further comparison (Test C), the same operations as those described in Example 1 were reproduced, but replacing the semiaromatic polyamide with the same amount (75% by weight) of an amorphous semiaromatic polyamide prepared by a conventional nylon 66 type process of bulk polycondensation in the melt, from hexamethylenediamine, isophthalic acid (70 mol % in the mixture of the diacids) and terephthalic acid (30 mol % in the mixture of the diacids), exhibiting a viscosity index of 112 ml/g (determined as described above on a solution of the polymer in meta-cresol).

By way of further comparison (Test D), Test C above was repeated, but this time using the amorphous semiaromatic polyamide by itself. Results of the impact strength measurements in Tests C and D are reported in the Table which follows.

TABLE

| EXAMPLE/ TEST | CHARPY RESILIENCE (*) in kJ/m² | | | | |
|---|---|---|---|---|---|
| | 23° C. | 10° C. | 0° C. | −10° C. | −25° C. |
| 1 | 11.1 | 10.9 | 11.1 | 10.9 | 10.9 |
| A | 9.8 | 9.6 | 8.9 | 8.6 | 7.4 |
| B | 5.9 | 5.4 | 6.4 | 8.3 | 6.8 |
| C | 6.4 | 7.6 | a | a | 7.1 |
| D | 12.4 | 12.2 | a | a | 10.9 |

(*) Each value shown is the average of 10 measurements which were carried out.
a Value not measured.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A single-phase and amorphous polymer blend, which comprises (i) an amorphous semiaromatic polyamide homo-or copolymer and (ii) a minor amount of a semicrystalline nylon polyamide, said amorphous semiaromatic polyamide (i) consisting of the following recurring structural units (I), (III) and, optionally, (IV):

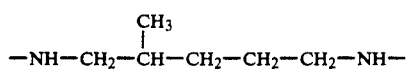

(I)

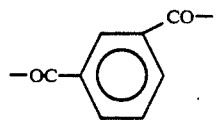

(III)

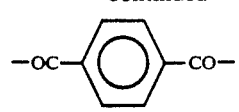

(IV)

in which the molar ratio of the units (I) relative to the sum of the units (III)+optionally (IV) is equal to 1; and the amount of the units (IV) in the total of (III)+(IV) ranges from 0% to 90mol %, and that of the units (III), relative to the same total, ranges from 100% to 10 mol %; and said semicrystallinepolyamide (ii) being selected from the group consisting of nylon 66, nylon 6, mixture thereof or copolymer of nylon 66 or 6 monomers; with the proviso that the amount of the semicrystalline polyamide (ii) is effective to improve the resilience of the polymer blend when compared to the copolyamide (i) alone.

2. The single-phase and amorphous blend of claim 1 wherein the polyamide (ii) is present in an amount no greater than 40% by weight of the blend.

3. The single-phase and amorphous polymer blend of claim 1, wherein said amorphous semiaromatic polyamide (i) the amount of the units (IV) in the total of (III)+(IV) ranges from 0% to 85 mol %, and that of the units (III), relative to the same total, ranges from 100% to 15 mol %; and said amorphous semiaromatic polyamide (i) having a viscosity index, VI, at least equal to 90 ml/g.

4. The single-phase and amorphous polymer blend as defined by claim 3, wherein said amorphous semiaromatic polyamide (i) the amount of the units (IV) in the total of (III)+(IV), ranges from 60% to 85 mol %, and that of the units (III), relative to the same total, ranges from 40% to 15 mol %; and said amorphous semiaromatic polyamide having a viscosity index, VI, ranging from 100 ml/g to 150 ml/g.

5. The single-phase and amorphous polymer blend as defined by claim 1, said semicrystalline nylon polyamide (ii) having a viscosity index, VI, at least equal to 120 ml/g.

6. The single-phase and amorphous polymer blend as defined by claim 5, said semicrystalline nylon polyamide (ii) comprising a nylon 66 polymer having a viscosity index, VI, ranging from 130 ml/g to 180 ml/g.

7. The single-phase and amorphous polymer blend as defined by claim 1, comprising from 10% to 40% by weight of said semicrystalline nylon polyamide (ii).

8. The single-phase and amorphous polymer blend as defined by claim 7, comprising from 20% to 35% by weight of said semicrystalline nylon polyamide (ii).

9. A shaped article comprising the single-phase and amorphous polymer blend as defined by claim 1.

* * * * *